United States Patent
Shin et al.

(10) Patent No.: US 10,938,030 B2
(45) Date of Patent: Mar. 2, 2021

(54) POSITIVE ACTIVE MATERIAL, POSITIVE ELECTRODE AND LITHIUM SECONDARY BATTERY CONTAINING THE MATERIAL, AND METHOD OF PREPARING THE MATERIAL

(71) Applicants: Samsung Electronics Co., Ltd., Suwon-si (KR); Samsung SDI Co., Ltd., Yongin-si (KR)

(72) Inventors: Dongwook Shin, Suwon-si (KR); San Moon, Hwaseong-si (KR); Jinsu Ha, Yongin-si (KR); Jinhwan Park, Seoul (KR); Changsoo Lee, Suwon-si (KR)

(73) Assignees: SAMSUNG ELECTRONICS CO., LTD., Gyeonggi-do (KR); SAMSUNG SDI CO. LTD., Gyeonggi-do (KR)

(*) Notice: Subject to any disclaimer, the term of this patent is extended or adjusted under 35 U.S.C. 154(b) by 201 days.

(21) Appl. No.: 15/713,914

(22) Filed: Sep. 25, 2017

(65) Prior Publication Data
US 2018/0316005 A1   Nov. 1, 2018

(30) Foreign Application Priority Data
Apr. 28, 2017 (KR) .................. 10-2017-0055759

(51) Int. Cl.
| | |
|---|---|
| H01M 4/525 | (2010.01) |
| H01M 4/131 | (2010.01) |
| H01M 4/04 | (2006.01) |
| H01M 10/052 | (2010.01) |
| C01G 53/00 | (2006.01) |
| H01M 2/02 | (2006.01) |
| H01M 4/02 | (2006.01) |
| G01N 23/20 | (2018.01) |

(52) U.S. Cl.
CPC ............ *H01M 4/525* (2013.01); *C01G 53/00* (2013.01); *C01G 53/50* (2013.01); *H01M 4/0471* (2013.01); *H01M 4/131* (2013.01); *H01M 10/052* (2013.01); *C01P 2002/20* (2013.01); *C01P 2002/50* (2013.01); *C01P 2002/52* (2013.01); *C01P 2002/54* (2013.01); *C01P 2002/72* (2013.01); *C01P 2002/76* (2013.01); *C01P 2002/85* (2013.01); *C01P 2004/03* (2013.01); *C01P 2004/04* (2013.01); *C01P 2004/51* (2013.01); *C01P 2004/61* (2013.01); *C01P 2004/62* (2013.01); *C01P 2004/64* (2013.01); *C01P 2004/80* (2013.01); *C01P 2006/40* (2013.01); *G01N 23/20075* (2013.01); *H01M 2/022* (2013.01); *H01M 2004/028* (2013.01)

(58) Field of Classification Search
CPC .... H01M 4/525; H01M 4/131; H01M 10/052; H01M 2004/028; C01G 53/00; C01G 53/50; C01P 2002/76; C01P 2004/51; C01P 2004/61; C01P 2004/62; C01P 2004/64; C01P 2004/80; C01P 2006/40
See application file for complete search history.

(56) References Cited

U.S. PATENT DOCUMENTS

| | | | |
|---|---|---|---|
| 2004/0091779 A1 | 5/2004 | Kang et al. | |
| 2009/0081548 A1* | 3/2009 | Nakura | H01M 4/366 |
| | | | 429/224 |
| 2012/0282524 A1 | 11/2012 | Kono et al. | |
| 2015/0010823 A1 | 1/2015 | Yu et al. | |
| 2015/0188134 A1* | 7/2015 | Kameyama | H01M 4/525 |
| | | | 252/182.1 |
| 2015/0311522 A1* | 10/2015 | Fang | H01M 4/485 |
| | | | 429/220 |
| 2016/0240856 A1 | 8/2016 | Paulsen et al. | |
| 2017/0301908 A1* | 10/2017 | Lee | H01M 4/525 |

FOREIGN PATENT DOCUMENTS

| | | |
|---|---|---|
| CN | 102054985 A | 5/2011 |
| CN | 102891307 A | 1/2013 |
| CN | 105932321 A | 9/2016 |
| EP | 2822065 A2 | 1/2015 |
| JP | 1997035989 A | 2/1997 |
| JP | 2013254639 A | 2/2013 |
| JP | 2013-254639 | * 12/2013 |
| JP | 201631881 A | 3/2016 |
| KR | 1020100042145 A | 4/2010 |
| WO | 2015049105 A1 | 4/2015 |

OTHER PUBLICATIONS

Zhu et al. "Synthesis and characterization of LiNi0.85Co0.15-2x(TiMg)xO2 as cathode materials for lithium-ion batteries", Materials Chemistry and Physics, vol. 88, Issue 1, Nov. 15, 2004, pp. 145-149.*
Lim et al., "The crystal structure and electrochemical performance of Li1.167Mn0.548Ni0.18Co0.105O2 composite catehodes doped and co-doped with Mg and F", Journal of Electroanalytical Chemistry, 740, 2015, pp. 88-94.

* cited by examiner

*Primary Examiner* — Laura Weiner
(74) *Attorney, Agent, or Firm* — Cantor Colburn LLP

(57) ABSTRACT

A positive active material, including: a lithium transition metal composite oxide represented by Formula 1:

$$Li_aNi_bM1_cM2_dM3_eO_2 \quad \text{Formula 1}$$

wherein, in Formula 1,
M1 comprises Co, Mn, or a combination thereof,
M2 comprises Mg and Ti,
M3 comprises Al, B, Ca, Na, K, Cr, V, Fe, Cu, Zr, Zn, Sr, Sb, Y, Nb, Ga, Si, Sn, Mo, W, Ba, a rare earth element, or a combination thereof,
$0.9 \leq a \leq 1.1$, $0.7 \leq b < 1.0$, $0 < c \leq 0.3$, $0 < d \leq 0.03$, $0 \leq e \leq 0.05$, and $0.95 \leq (b+c+d+e) \leq 1.05$, and
a molar ratio of Ti:Mg in M2 is about 1:1 to about 3:1.

21 Claims, 8 Drawing Sheets

FIG. 4A
Comparative Example 1
FIG. 4B
Example 1
FIG. 4C
Example 2
FIG. 4D
Example 3
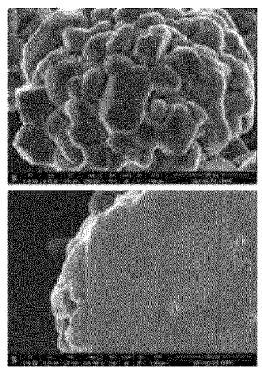 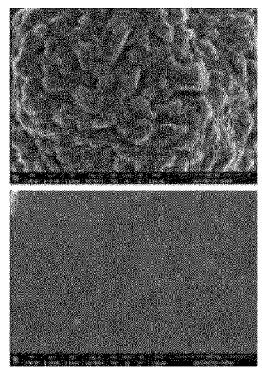 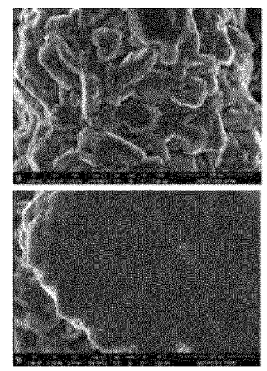 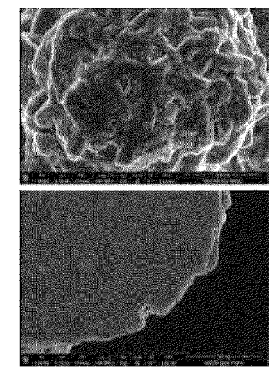
FIG. 4E
FIG. 4F
FIG. 4G
FIG. 4H
500nm

| Comparative Example 1 | Example 1 | Example 2 | Example 3 |
|---|---|---|---|
        |
| | | | ⊢—⊣ 500nm |
        |
| | | | ⊢—⊣ 200nm |
      |
| | | | ⊢—⊣ 200nm |
      |
| | | | ⊢—⊣ 200nm |

Comparative Example 6-1

Comparative Example 6-2

Example 14

⊢———⊣ 1um

Comparative Example 7-1

Comparative Example 7-2

Comparative Example 7-3

Comparative Example 7-4

Comparative Example 7-5

Comparative Example 7-6

POSITIVE ACTIVE MATERIAL, POSITIVE ELECTRODE AND LITHIUM SECONDARY BATTERY CONTAINING THE MATERIAL, AND METHOD OF PREPARING THE MATERIAL

CROSS-REFERENCE TO RELATED APPLICATION

This application claims priority to and the benefit of Korean Patent Application No. 10-2017-0055759, filed on Apr. 28, 2017, in the Korean Intellectual Property Office, and all the benefits accruing therefrom under 35 U.S.C. § 119, the content of which is incorporated herein in its entirety by reference.

BACKGROUND

1. Field

The present disclosure relates to a positive active material, a positive electrode and a lithium secondary battery which include the positive active material, and a method of preparing the positive active material.

2. Description of the Related Art

The trend toward electronic devices having a smaller size and higher performance has increased interest in lithium secondary batteries that have high energy density, a small size, and a low weight. That is, lithium secondary batteries having a high capacity are desired.

Therefore, there is a need to develop a positive active material having high capacity and which is capable of improving the lifetime characteristics of a battery.

SUMMARY

Provided is a positive active material capable of improving lifetime characteristics of a lithium secondary battery.

Provided is a positive electrode including the positive active material.

Provided is a lithium secondary battery using the positive electrode.

Provided is a method of preparing the positive active material.

According to an aspect of an embodiment, a positive active material for a lithium secondary battery includes a lithium transition metal composite oxide represented by Formula 1:

Formula 1 wherein, in Formula 1,

M1 includes Co, Mn, or a combination thereof,

M2 includes Mg and Ti,

M3 includes Al, B, Ca, Na, K, Cr, V, Fe, Cu, Zr, Zn, Sr, Sb, Y, Nb, Ga, Si, Sn, Mo, W, Ba, a rare earth element, or a combination thereof, $0.9 \leq a \leq 1.1$, $0.7 \leq b < 1.0$, $0 < c \leq 0.3$, $0 < d \leq 0.03$, $0 \leq e \leq 0.05$, and $0.95 \leq (b+c+d+e) \leq 1.05$, and a molar ratio of Ti:Mg in M2 is about 1:1 to about 3:1.

According to an aspect of another embodiment, a positive electrode includes the above-described positive active material.

According to an aspect of another embodiment, a lithium secondary battery includes the above-described positive electrode.

According to an aspect of another embodiment, a method of preparing the above-described positive active material includes: providing a mixture including a transition metal precursor, a lithium source, a Mg-containing compound, and a Ti-containing compound; and thermally treating the mixture to prepare the lithium transition metal composite oxide represented by Formula 1, wherein an amount of the Mg-containing compound and an amount of the Ti-containing compound are such that a molar ratio of Ti:Mg is about 1:1 to about 3:1.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which:

FIGS. 4A to 4H show the results of scanning electron microscope (SEM) analysis of the positive active materials of Comparative Example 1 and Examples 1 to 3 in which FIGS. 4A to 4D show the particle surface and FIGS. 4E to 4H show a cross-section of the particle;

FIGS. 5I to 5N shows the results of transmission electron microscope-energy dispersive spectroscopy (TEM-EDS) mapping of the positive active materials of Examples 1 to 3, in which FIGS. 5I to 5K are Ti maps and FIGS. 5L to 5N are Mg maps;

DETAILED DESCRIPTION

Figure 1:
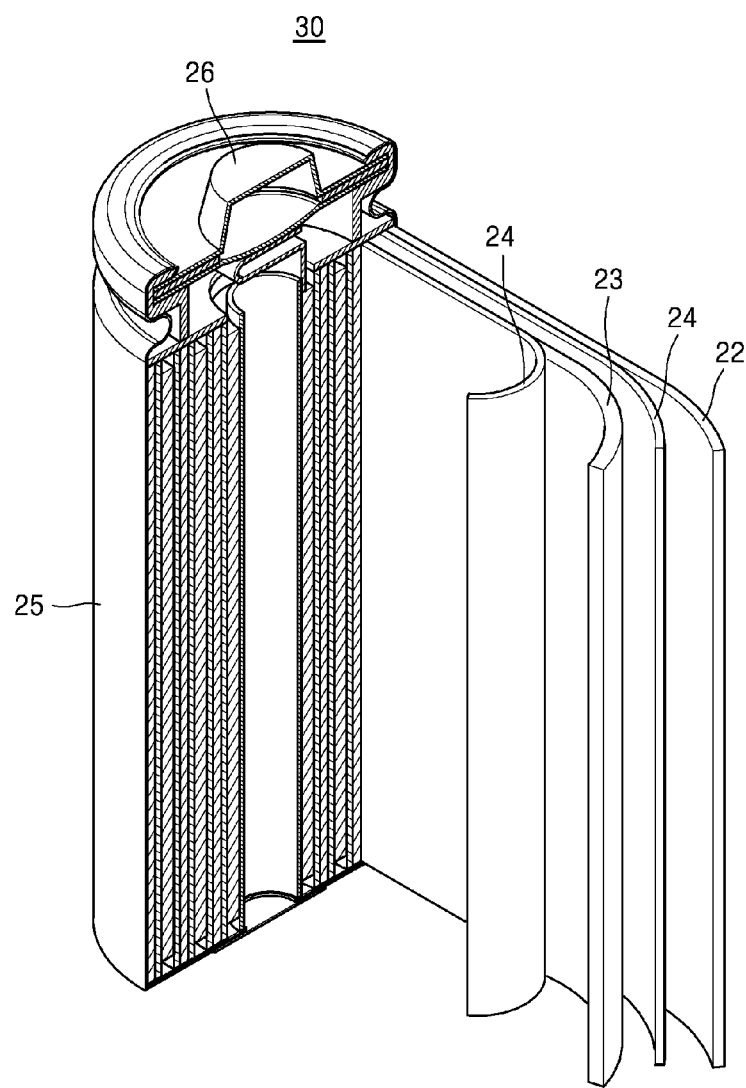
FIG. 1 is a schematic view illustrating a structure of a lithium secondary battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A "grain" as used herein means a particle or region of a particle having a single crystallographic orientation.

Hereinafter, example embodiments of a positive active material for a lithium secondary battery, a method of preparing the positive active material, a positive electrode including the positive active material, and a lithium secondary battery including the positive electrode will be described in detail.

To obtain a lithium battery having a high energy density, a small size, and a low weight, positive active materials having a high capacity have been investigated. For example, lithium cobalt oxide ($LiCoO_2$) as a single component has been used as a positive active material for a lithium secondary battery, as has a layered lithium composite metal oxide. To further increase the capacity of a battery, research related to increasing the nickel content in a lithium composite metal oxide has been conducted.

However, a lithium composite metal oxide having high nickel content has poor structural stability, and thus may cause damage to the lattice structure of the positive active material consequently leading to sharp reduction in the lifetime characteristics of a battery.

Commercially available LCO ($LiCoO_2$) and low-Ni nickel-cobalt manganese (NCM) materials having a Ni content of less than 70%, such as NCM111, NCM523, and NCM622 can be easily synthesized at a temperature of about 800° C. to about 950° C., while high-Ni NCM materials having a Ni content of 70% or greater can be synthesized under a lower temperature condition of 800° C. or less with a limited amount of heat. This is attributed to the generation of divalent nickel ion ($Ni^{2+}$) from a high-Ni NCM, due to its high Ni content, when it is subjected to high-temperature conditions above a threshold temperature or when a threshold amount of heat migrates into a Li layer having a layered structure belonging to an R3-m space group, consequently generating a NiO-like phase with characteristics of high resistance and belonging to an Fm3-m space group due to the occurrence of cation mixing. This may inhibit reversible intercalation/deintercalation of lithium ions, causing a reduction in capacity and capacity retention rate.

To improve these drawbacks, various technologies have tried to inhibit cation mixing from occurring in a high-temperature synthesis process, for example, by using an excess amount of a lithium source and improving cell performance by adding a dopant element. However, using an increased amount of a lithium source in the synthesis of a high-Ni (Ni≥70%) NCM material may lead to excessive growth of grains (primary particles) in the positive active material, and in particular, on a surface region of secondary particles (agglomerates of primary particles), and consequently a reduced diffusion rate of lithium ions. During charging and discharging, repeated shrinkage and expansion of the grains may occur due to the intercalation/deintercalation of lithium ions. In this regard, due to excessive growth of grains and a non-uniform grain size, a positive active material according to conventional technology may have poor resistance against the physical stress caused by such repeated shrinkage and expansion, such that a conduction path of the positive active material particles may become disconnected resulting in a dead zone where charge does not reach, and consequently, resulting in deteriorated battery performance. The grain growth after high-temperature thermal treatment may be varied by using a dopant and controlling the lithium content. When the grain size is too small, a lithium secondary battery may have deteriorated performance due to poor development of the layered structure. Meanwhile, when the grain size is too large, due to the above-described drawbacks, such as a reduced diffusion rate of lithium ions, poor resistance against physical stress caused by repeated shrinkage and expansion of the grains, or the like, a lithium secondary battery may have deteriorated performance.

In this regard, the inventors of the present disclosure have advantageously discovered that performance of a lithium secondary battery, including lifetime characteristics, may be improved by using a positive active material including both Mg and Ti as doping elements and by controlling a lithium source content and a grain size. Hereinafter, embodiments of a positive active material for a lithium secondary battery will now be described.

According to an aspect of the present disclosure, a positive active material includes a lithium transition metal composite oxide represented by Formula 1.

$$Li_aNi_bM1_cM2_dM3_eO_2 \qquad \text{Formula 1}$$

in Formula 1,

M1 may include Co, Mn, or a combination thereof,

M2 may include Mg and Ti,

M3 may include Al, B, Ca, Na, K, Cr, V, Fe, Cu, Zr, Zn, Sr, Sb, Y, Nb, Ga, Si, Sn, Mo, W, Ba, a rare earth element, or a combination thereof, 0.9≤a≤1.1, 0.7≤b<1.0, 0<c≤0.3, 0<d≤0.03, 0≤e≤0.05, and 0.95≤(b+c+d+e)≤1.05, and a molar ratio of Ti:Mg in M2 may be about 1:1 to about 3:1.

When a positive active material is doped with Mg or Ti alone, performance improvement does not occur compared to an undoped positive active material. However, the positive active material which is doped with both Mg and Ti, according to an embodiment, may have remarkably improved performance as compared to an undoped positive active material. When Mg is used alone as the dopant, a significant increase in the grain size may occur as the amount of Mg increases. When Ti is used alone as the dopant, the grain size may be reduced. Accordingly, a cycle lifetime improvement effect expected from doping with Mg may be cancelled by the grain size increase caused by the doped Mg. However, when Mg is doped together with Ti, the grain size increase may be inhibited so that cycle lifetime characteristics may be improved.

For example, the lithium transition metal composite oxide may be represented by Formula 2.

$$Li_aNi_bCO_cMn_{c'}Mg_{d'}Ti_{d''}M3_eO_2 \qquad \text{Formula 2}$$

in Formula 2,

M3 may include Al, B, Ca, Na, K, Cr, V, Fe, Cu, Zr, Zn, Sr, Sb, Y, Nb, Ga, Si, Sn, Mo, W, Ba, a rare earth element, or a combination thereof, 0.9≤a≤1.1, 0.7≤b<1.0, 0<c'<0.3, 0<c''<0.3, 0<(c'+c'')≤0.3, 0<d'<0.03, 0<d''<0.03, 0<(d'+d'')≤0.03, 0≤e≤0.05, and (b+c'+c''+d'+d''+e)=1, and a molar ratio of Ti:Mg (d''/d') may be about 1:1 to about 3:1.

For example, the lithium transition metal composite oxide may be represented by Formula 3.

$$Li_aNi_bCo_cMn_{c''}Mg_{d'}Ti_{d''}O_2 \qquad \text{Formula 3}$$

in Formula 3, 0.9≤a≤1.1, 0.7≤b<1.0, 0<c'<0.3, 0<c''<0.3, 0<(c'+c'')≤0.3, 0<d'<0.03, 0<d''<0.03, 0<(d'+d'')≤0.03, and (b+c'+c''+d'+d'')=1, and a molar ratio of Ti:Mg (d''/d') may be about 1:1 to about 3:1.

In Formulae 1 to 3, a content of Ni may be about 70 mole % or greater of a total metal content including all transition metals except for lithium. Such a high nickel content may lead to a high capacity. Accordingly, a high-capacity lithium secondary battery including the positive active material according to any of the embodiments, may be obtained.

In Formulae 1 to 3, a molar ratio of Ti:Mg may be about 1:1 to about 3:1, and in some embodiments, about 1:1 to about 2.5:1, and in some other embodiments, about 1.4:1 to about 2.4:1. When the molar ratio of Ti:Mg is within these ranges, a lithium secondary battery having improved cycle lifetime characteristics may be implemented.

The lithium transition metal composite oxide according to an embodiment may include a layered crystalline phase belonging to an R-3m space group. The lithium transition metal composite oxide may have a layered structure free of an impurity phase due to being doped with Mg and Ti. For example, the lithium transition metal composite oxide may be free of impurities such as a NiO-like crystalline phase belonging to an Fm3-m space group, and thus may lead to high capacity and improved lifetime.

In some embodiments, the lithium transition metal composite oxide may have a grain size of about 50 nanometers (nm) to about 1000 nm. For example, the lithium transition metal composite oxide may have a grain size of about 50 nm to about 500 nm, and in some other embodiments, about 100 nm to about 200 nm. As used herein, the term "grain" (also referred to as "primary particle") refers to a solid phase in which atoms are oriented in a regular fashion to form a uniform crystal structure, wherein the solid phase is enclosed by geometrical faces at an outer portion thereof. A grain size within the above ranges may be attained by simultaneous doping with Mg and Ti. When the lithium transition metal composite oxide has a grain size within the above ranges, over-growth of grains may be inhibited, and grain size uniformity may be improved. Accordingly, a lithium secondary battery having improved lifetime characteristics may be implemented.

In some embodiments, the lithium transition metal composite oxide may be in the form of small-diameter particles having an average particle diameter (D50) of about 1 micrometer (μm) to about 5 μm. The small-diameter particles are formed by agglomeration of a plurality of grains of the lithium transition metal composite oxide. For example, the small-diameter particles may have an average particle diameter (D50) of about 1 μm to about 4 μm, and in some embodiments, about 1 μm to about 3 μm, and in some other embodiments, about 1 μm to about 2 μm. When the small-diameter particles have an average particle diameter (D50) within these ranges, the positive active material may have further improved charge-discharge characteristics.

As used herein, the term "average particle diameter" may mean a "D50" particle diameter, which refers to a particle size corresponding to 50% of the total particles accumulated from smallest to largest in size (ascending order) in a cumulative distribution, wherein a total number of the accumulated particles is 100%. D50 may be measured using any suitable method, for example, a particle size analyzer, a transmission electron microscopy (TEM) image, or a scanning electron microscopy (SEM) image. As another method, D50 may be measured using a dynamic light scattering instrument, wherein the number of individual particles in each size range may be counted and the average particle diameter may be calculated from the counted numbers of the particles.

In addition to the small-diameter particles, the positive active material may further include large-diameter particles having a composition that is the same as or different from that of the small-diameter particles. In this case, a lithium secondary battery having further improved performance may be implemented.

In some embodiments, the lithium transition metal composite oxide may be in the form of large-diameter particles having an average particle diameter (D50) of about 10 µm to about 20 µm formed by agglomeration of a plurality of grains of the lithium transition metal composite oxide. For example, the large-diameter particles may have an average particle diameter (D50) of about 10 µm to about 18 µm, and in some embodiments, about 10 µm to about 16 µm, and in some other embodiments, about 10 µm to about 14 µm. When the large-diameter particles have an average particle diameter (D50) within these ranges, the positive active material may have further improved charge-discharge characteristics.

In addition to the large-diameter particles, the positive active material may further include small-diameter particles having a composition that is the same as or different from that of the large-diameter particles. In this case, a lithium secondary battery having further improved performance may be implemented.

For example, the positive active material may include small-diameter particles having an average particle diameter of about 1 µm to about 5 µm formed by agglomeration of a plurality of grains of the lithium transition metal composite oxide, and large-diameter particles having an average particle diameter of about 10 µm to about 20 µm formed by agglomeration of a plurality of grains of the lithium transition metal composite oxide. That is, the positive active material may have a bimodal particle size distribution of the large-diameter particles and the small-diameter particles, each of which have the same composition.

In the positive active material including large-diameter particles and small-diameter particles as described above, which may have the same or different composition, a particle size ratio of large-diameter particles to small-diameter particles may be about 20:1 to about 2:1. For example, a particle size ratio of large diameter particles to small-diameter particles in the positive active material may be about 15:1 to about 3:1, and in some embodiments, about 10:1 to about 4:1, and in some other embodiments, about 10:1 to about 5:1. When the positive active material has a particle size ratio within these ranges, the positive active material may have further improved charge-discharge characteristics.

In a positive active material according to an embodiment including large-diameter particles and small-diameter particles as described above, the amount of the small-diameter particles may be about 1 weight percent (wt %) to about 30 wt % based on a total weight of the positive active material. For example, the amount of the small-diameter particles in a positive active material according to an embodiment may be about 3 wt % to about 25 wt %, and in some embodiments, about 5 wt % to about 20 wt %, and in some other embodiments, about 7 wt % to about 15 wt %, based on a total weight of the positive active material. When the amount of the small-diameter particles is within these ranges, the positive active material may have further improved charge-discharge characteristics.

A positive active material according to an embodiment including large-diameter particles and small-diameter particles as described above may have a press density of about 3.0 grams per cubic centimeter (g/cc) or greater when pressed with a force of about 2,360 kgf for about 30 seconds.

The higher the press density of the positive active material, the higher the energy density of the positive active material may become. For example, the positive active material including large-diameter particles and small-diameter particles as described above may have a press density of about 3.2 g/cc of greater, and in some embodiments, a press density of about 3.4 g/cc or greater, and in some other embodiments, a press density of about 3.6 g/cc or greater, and in still other embodiments, a press density of about 3.7 g/cc or greater, when pressed down with a force of about 2,360 kgf for about 30 seconds.

In a positive active material according to any of the embodiments, the Mg and Ti elements may be uniformly distributed in the particles (i.e., secondary particles) formed by agglomeration of a plurality of grains (or primary particles) of the lithium transition metal composite oxide.

In some embodiments, the positive active material may further include a surface modifying layer, e.g., a surface coating layer, on a surface thereof. For example, the positive active material may include a surface coating layer on the surface thereof. For example, the surface coating layer may be a metal compound-containing coating layer including Li, Al, B, Mg, Ca, Na, K, Ti, Mn, Co, Sr, Cr, V, Fe, Zr, Zn, Si, Y, Nb, Ga, Sn, Mo, W, Ba, a rare earth element, or a combination thereof. The metal compound may include a metal oxide ($MO_x$), a metal sulfide ($MS_x$), a metal chloride ($MCl_x$), a metal nitride ($MN_x$), a metal fluoride ($MF_x$), a metal phosphide ($M(PO_4)_x$), a metal alkoxide, or a combination thereof.

According to another aspect of the present disclosure, a positive electrode includes a positive active material according to any of the above-described embodiments.

The positive electrode may be prepared as follows. A positive active material according to any of the above-described embodiments, a conducting agent, a binder, and a solvent may be mixed together to prepare a positive electrode slurry composition. The positive electrode slurry composition may be directly coated on an aluminum current collector to prepare a positive electrode having a positive active material film. In some embodiments, the positive electrode slurry composition may be cast on a separate support to form a positive active material film. This positive active material film may then be separated from the support and laminated on an aluminum current collector to prepare a positive electrode having the positive active material film.

The conducting agent may include carbon black, graphite particles, natural graphite, artificial graphite, acetylene black, Ketjen black, carbon fibers, carbon nanotubes, graphene, a metal powder, a metal fiber or a metal tube of copper, nickel, aluminum, or silver, or a conductive polymer such as a polyphenylene derivative, but embodiments are not limited thereto. A combination comprising at least one of the foregoing may be used. Any suitable material available as a conducting agent may be used.

Examples of the binder include a vinylidene fluoride/hexafluoropropylene copolymer, polyvinylidene fluoride (PVDF), polyacrylonitrile, polymethyl methacrylate, polytetrafluoroethylene (PTFE), and a styrene butadiene rubber polymer, or a combination thereof, but embodiments are not limited thereto. Any suitable material available as a binding agent may be used. Examples of the solvent include N-methyl-pyrrolidone (NMP), acetone, or water, but embodiments are not limited thereto. Any suitable material available as a solvent may be used.

In some embodiments, a plasticizer may be further added to the positive electrode slurry composition to obtain a positive electrode including pores.

The amounts of the positive active material, the conducting agent, the binder, and the solvent may be the same as those generally used for lithium secondary batteries, and may be determined by the person of skill in the art without undue experimentation. At least one of the conducting agent, the binder, and the solvent may be omitted according to the use and the structure of the lithium secondary battery.

The positive electrode may include a positive active material according to any of the above-described embodiments alone or may further include a common positive active material having at least one different technical feature, for example, in terms of composition or particle diameter.

The common positive active material may be any lithium-containing metal oxide. For example, the common positive active material may include a composite oxide of lithium with a metal selected from among Co, Mn, Ni, or a combination thereof. For example, the common positive active material may include compounds represented by the following formula: $Li_aA_{1-b}B'_bD_2$ (wherein $0.90 \leq a \leq 1$, and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$. A combination comprising at least one of the foregoing may also be used.

In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

In some embodiments, the positive active material may be $LiCoO_2$, $LiMn_xO_{2x}$ (wherein x may be 1 or 2), $LiNi_{1-x}Mn_xO_{2x}$ (wherein $0 < x < 1$), $LiNi_{1-x-y}Co_xMn_yO_2$ (wherein $0 \leq x \leq 0.5$ and $0 \leq y \leq 0.5$), $FePO_4$, or a combination thereof.

The compounds listed above as positive active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), a rare earth element, or a combination thereof. The coating layer may be formed using a compound of these coating elements by any method that does not adversely affect the physical properties of the positive active material. For example, the coating layer may be formed using a spray coating method, a dipping method, or any other suitable coating method. Thus, a detailed description thereof will be omitted herein.

The positive electrode current collector may have a thickness of about 3 μm to about 500 μm. The positive electrode current collector is not particularly limited, and may be any material so long as it has a suitable conductivity without causing chemical changes in the fabricated battery. Examples of the positive electrode current collector include copper, stainless steel, aluminum, nickel, titanium, sintered carbon, copper, or stainless steel that is surface-treated with carbon, nickel, titanium or silver, or aluminum-cadmium alloys. In addition, the positive electrode current collector may be processed to have fine irregularities on a surface thereof so as to enhance adhesive strength of the positive electrode current collector to the positive active material, and may be used in any of various forms, including films, sheets, foils, nets, porous structures, foams, and non-woven fabrics.

The positive electrode may have a mixed density of at least about 2.0 g/cc.

According to another aspect of the present disclosure, a lithium secondary battery includes a positive electrode including a positive active material according to any of the above-described embodiments.

For example, the lithium secondary battery may include: a positive electrode including a positive active material according to any of the above-described embodiments; a negative electrode disposed opposite to the positive electrode; and an electrolyte between the positive electrode and the negative electrode.

The positive electrode of the lithium secondary battery may be manufactured as described above.

The negative electrode may be manufactured as follows. The negative electrode may be manufactured in the same manner as applied to the positive electrode, except that a negative active material is used instead of the positive active material. A conducting agent, a binder, and a solvent used to prepare a negative electrode slurry composition may be the same as those used to manufacture the positive electrode.

For example, a negative active material, a binder and a solvent, and optionally a conducting agent may be mixed together to prepare the negative electrode slurry composition. The negative electrode slurry composition may be directly coated on a negative electrode current collector to manufacture a negative electrode. In some embodiments, the negative electrode slurry composition may be cast on a separate support to form a negative active material film. This negative active material film may then be separated from the support and laminated on a negative electrode current collector to manufacture a negative electrode.

The negative active material may be any material that is generally used for lithium secondary batteries in the art. For example, the negative active material may include lithium metal, a metal that is alloyable with lithium, a transition metal oxide, a non-transition metal oxide, a carbonaceous material, or a combination thereof.

For example, the metal alloyable with lithium may be Si, Sn, Al, Ge, Pb, Bi, Sb, an Si—Y alloy (wherein Y may be an alkali metal, an alkaline earth metal, a Group 13 element, a Group 14 element, a transition metal, a rare earth element, or a combined element thereof, but is not Si), or an Sn—Y alloy (wherein Y may be an alkali metal, an alkaline earth metal, a Group 13 element, a Group 14 element, a transition metal, a rare earth element, or a combined element thereof, but is not Sn). For example, the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may be a lithium titanium oxide, a vanadium oxide, a lithium vanadium oxide, or a combination thereof.

For example, the non-transition metal oxide may be $SnO_2$, $SiO_x$ (wherein 0<x<2), or a combination thereof.

For example, the carbonaceous material may be crystalline carbon, amorphous carbon, or a combination thereof. Examples of the crystalline carbon may include graphite, such as natural graphite or artificial graphite in amorphous, plate, flake, spherical, or fibrous form. Examples of the amorphous carbon may include soft carbon (carbon calcined at a low-temperature), hard carbon, meso-phase pitch carbide, calcined cokes, or a combination thereof.

The amounts of the negative active material, the conducting agent, the binder, and the solvent may be determined by one of skill the art without undue experimentation.

The negative electrode current collector may have, for example, a thickness of about 3 µm to about 500 µm. The negative electrode current collector is not particularly limited, and may be any suitable material so long as it has an electrical conductivity which does not cause chemical changes in the fabricated battery. Examples of the negative electrode current collector include copper, stainless steel, aluminum, nickel, titanium, sintered carbon, copper or stainless steel that is surface-treated with carbon, nickel, titanium or silver, aluminum-cadmium alloys, or a combination thereof. In addition, the negative electrode current collector may be processed to have fine irregularities on a surface thereof so as to enhance adhesive strength of the negative electrode current collector to the negative active material, and may be used in any of various forms, including films, sheets, foils, nets, porous structures, foams, and non-woven fabrics.

The negative electrode and the positive electrode may be separated from each other by a separator. The separator may be any separator that is commonly used for lithium batteries. For example, a suitable separator may have low resistance to migration of ions in an electrolyte and have high electrolyte-retaining ability. Examples of a material for the separator include glass fiber, polyester, Teflon, polyethylene, polypropylene, polytetrafluoroethylene (PTFE), or a combination thereof, each of which may be a nonwoven fabric or a woven fabric. The separator may have a pore diameter of about 0.01 µm to about 10 µm and a thickness of about 5 µm to about 300 µm.

A lithium salt-containing non-aqueous electrolyte may include a non-aqueous electrolyte and a lithium salt. Examples of the non-aqueous electrolyte are a non-aqueous electrolyte solution, an organic solid electrolyte, an inorganic solid electrolyte, or the like.

As the non-aqueous electrolyte solution, an aprotic organic solvent may be used. Examples of the aprotic organic solvent are N-methyl-2-pyrrolidinone, propylene carbonate, ethylene carbonate, butylene carbonate, dimethyl carbonate, diethyl carbonate, fluorinated ethylene carbonate, ethylenemethylene carbonate, methylpropyl carbonate, ethylpropanoate, methylacetate, ethylacetate, propylacetate, dimethylester gamma-butyrolactone, 1,2-dimethoxy ethane, tetrahydrofurane, 2-methyl tetrahydrofurane, dimethylsulfoxide, 1,3-dioxorane, formamide, dimethylformamide, dioxolane, acetonitrile, nitromethane, methyl formic acid, trimester phosphoric acid, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionic acid, ethyl propionic acid, or the like.

Examples of the organic solid electrolyte include a polyethylene derivative, a polyethylene oxide derivative, a polypropylene oxide derivative, a phosphate ester polymer, poly-l-lysine, polyester sulfide, polyvinyl alcohol, poly fluorinated vinylidene, a polymer having a dissociable ionic group, or the like, or a combination thereof.

Examples of the inorganic solid electrolyte include nitrides, halides, and sulfides of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like. A combination comprising at least one of the foregoing may also be used.

The lithium salt may be any one of suitable lithium salts that are used in lithium secondary batteries. A material soluble in the non-aqueous electrolyte may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carbonic acid lithium, lithium terphenylborate, lithium imide, or a combination thereof.

A lithium secondary battery may be categorized as a lithium ion battery, a lithium ion polymer battery, or a lithium polymer battery, according to the type of separator and/or electrolyte included therein. A lithium secondary battery may be classified as a cylindrical-type, rectangular-type, coin-type, or pouch-type, according to a shape thereof. A lithium secondary battery may also be classified as either a bulk-type or thin film-type, according to a size thereof.

Methods of manufacturing lithium secondary batteries may be determined by one of skill in the art without undue experimentation, and thus a detailed description thereof will be omitted here.

FIG. 1 is a schematic view illustrating a structure of a lithium secondary battery 30 according to an exemplary embodiment.

Referring to FIG. 1, the lithium secondary battery 30 according to an embodiment may include a positive electrode 23, a negative electrode 22, and a separator 24 disposed between the positive electrode 23 and the negative electrode 22. The positive electrode 23, the separator 24, and the negative electrode 22 may be wound or folded together, and then be encased in a battery case 25. An electrolyte according to any of the above-described embodiments may be injected into the battery case 25, and then the battery case 25 may be sealed with a cap assembly member 26, thereby manufacturing the lithium secondary battery 30. The battery case 25 may be a cylindrical case, a rectangular case, or a thin-filmed case. The lithium secondary battery 30 may be a lithium ion battery.

A lithium secondary battery according to any of the above-described embodiments may be used as a power source for a small electronic device, such as a mobile phone or a portable computer, or may also be used as a unit cell of a multi-cell battery module of a medium- or large-sized device.

Examples of the medium- or large-sized device are power tools; electric cars (referred to as xEV), including electric vehicles (EVs), hybrid electric vehicles (HEVs), and plug-in hybrid electric vehicles (PHEVs); and electric two-wheeled vehicles, including electric bicycles and electric scooters; electric golf carts; electric trucks; electric commercial vehicles; and power storage systems. However, embodiments are not limited thereto. Furthermore, a lithium secondary battery according to any of the embodiments may be used in any other applications that require high power output, high voltage, and high-temperature operation. For example, the lithium secondary battery may be used in applications requiring a high voltage ranging from about 4.3 volts (V) to about 4.6 V.

According to another aspect of the present disclosure, a method of preparing a positive active material according to an embodiment includes: providing a mixture including a transition metal precursor, a lithium source, a Mg-containing compound, and a Ti-containing compound; and thermally treating the mixture to prepare the lithium transition metal composite oxide represented by Formula 1, wherein an amount of the Mg-containing compound and an amount of the Ti-containing compound are such that a molar ratio of Ti:Mg is about 1:1 to about 3:1.

The transition metal precursor is not specifically limited. For example, a transition metal hydroxide may be used as the transition metal precursor.

A transition metal hydroxide as a transition metal precursor may be synthesized using, for example, a co-precipitation method. For example, after a transition metal source in the form of a water-soluble salt, for example, a sulfate, a nitrate, a carbonate, an acetate, a chloride, or an oxide is mixed in a certain molar concentration to prepare an aqueous solution, a base, for example, NaOH, NH$_4$OH, or KOH may be added thereto as a pH-adjusting agent to obtain a transition metal hydroxide as a transition metal precursor.

For example, a transition metal precursor may be used. For example, the transition metal precursor may include a nickel precursor, a cobalt precursor, a manganese precursor, optionally other metal precursors, or a combination thereof. For example, the nickel precursor may be nickel sulfate, nickel acetate, or the like, or a combination thereof. For example, the cobalt precursor may be cobalt sulfate, cobalt acetate, or the like, or a combination thereof. The manganese precursor may be manganese sulfate, manganese acetate, or the like, or a combination thereof. The other metal precursors may include copper sulfate, tin chloride, titanium isopropoxide, ruthenium acetylacetonate, or the like, or a combination thereof. A molar ratio of these transition metal precursors may be chosen according to the desired composition of a positive active material.

For example, the lithium source may be a lithium salt including lithium cations, for example, lithium nitrate (LiNO$_3$), lithium acetate (CH$_3$COOLi), lithium carbonate (Li$_2$CO$_3$), lithium hydroxide (LiOH), or a combination thereof. However, embodiments are not limited thereto.

The Mg-containing compound, which is used as a dopant source, may be a compound in the form of a hydrate, a sulfate, a nitrate, a carbonate, a halide salt, an acetate, a chloride, an oxide, an acetylacetonate, or a nitrate, including Mg cations. However, embodiments are not limited thereto.

The Ti-containing compound, which is used as a dopant source, may be a compound in the form of a hydrate, a sulfate, a nitrate, a carbonate, a halide salt, an acetate, a chloride, an oxide, an acetylacetonate, or a nitrate, including Ti cations. However, embodiments are not limited thereto.

In some embodiments, providing of the mixture includes preparing the mixture by mixing a transition metal precursor, a lithium source, a Mg-containing compound, and a Ti-containing compound. The mixing may by wet mixing or dry mixing. However, embodiments are not limited thereto.

For example, wet mixing may include mixing a transition metal precursor, a lithium source, a Mg-containing compound, and a Ti-containing compound in a solvent such as alcohol to prepare an alcohol solution and drying out the solvent to prepare a dry mixture. For example, dry mixing may include mechanically mixing a transition metal precursor, a lithium source, and dopant sources in powder state to prepare a mixture. For example, dry mixing may be used in view of ease of preparation.

The dry mixing may be performed by ball milling. Balls which may be used in ball milling may be, for example, zirconia balls. Any type of balls may be used in ball milling. A ball size may be, for example, about 0.3 millimeters (mm) to about 10 mm. However, embodiments are not limited thereto. For example, ball milling may be carried out for about 4 hours to about 48 hours. Any of various methods of homogeneously mixing reactants, not only ball mixing, may be used.

The thus-obtained mixture may be thermally treated, for example, in a temperature range of about 600° C. to about 1,000° C. in an atmosphere including oxygen (e.g., air or pure oxygen), thereby obtaining the positive active material. For example, the thermal treatment may be performed in a temperature range of about 600° C. to about 800° C. The thermal treatment temperature and duration may be appropriately controlled within appropriate ranges in consideration of the types of metals used to provide improved physical properties.

In some embodiments, to remove free (e.g., residual) lithium compound (for example, LiOH, Li$_2$CO$_3$, or the like) which may remain on the surface of the positive active material, the free lithium compound may be dissolved with a solvent, for example, water or an organic solvent.

In some embodiments, to further improve battery performance, surface modification or surface coating may be performed on the surface of the positive active material through, for example, a precipitation reaction.

For example, as a surface coating layer, a metal compound-containing coating layer may be formed on the surface of the positive active material by mixing a source compound including Li, Al, B, Mg, Ca, Na, K, Ti, Mn, Co, Sr, Cr, V, Fe, Zr, Zn, Si, Y, Nb, Ga, Sn, Mo, W, Ba, a rare earth element, or a combination thereof, with the positive active material.

One or more embodiments of the present disclosure will now be described in detail with reference to the following examples. However, these examples are only for illustrative purposes and are not intended to limit the scope of the one or more embodiments of the present disclosure.

EXAMPLES

Preparation of Positive Active Material

Example 1

(1) Preparation of $Li_{1.015}(Ni_{0.88}Co_{0.08}Mn_{0.04})_{0.98}Mg_{0.005}Ti_{0.015}O_2$ as Positive Active Material First, $Ni_{0.88}Co_{0.08}Mn_{0.04}(OH)_2$ as a core active material precursor was prepared by co-precipitation after stoichiometrically mixing nickel sulfate, cobalt sulfate, and manganese sulfate. In particular, nickel sulfate, cobalt sulfate, and manganese sulfate were dissolved in distilled water at a concentration of 2 molar (M) to obtain a precursor mixture. $NH_4OH$ as a chelating agent and NaOH as a precipitant were added to the precursor mixture, followed by a co-precipitation reaction at about 50° C. at a pH condition of about 11.5 to 12.6 to obtain a precipitate $Ni_{0.88}Co_{0.08}Mn_{0.04}(OH)_2$. The resulting precipitate $Ni_{0.88}CO_{0.08}Mn_{0.04}(OH)_2$ was washed with distilled water and dried at about 80° C. for about 24 hours. The precipitate $Ni_{0.88}Co_{0.08}Mn_{0.04}(OH)_2$ had an average particle diameter (D50) of about 2.0 μm.

1,000 g of the precipitate $Ni_{0.88}CO_{0.08}Mn_{0.04}(OH)_2$, 456 g of $LiOH.H_2O$ (98%, available from Gangfeng Lithium Co. Ltd) as a lithium precursor, and 3.1 g of $Mg(OH)_2$ and 12.8 g of $TiO_2$ as doping-element precursors were homogeneously dry-mixed with a Henschel mixer to prepare a mixture.

The mixture was thermally treated in a furnace at about 700° C. for about 7 hours to prepare a positive active material represented by $Li_{0.015}(Ni_{0.88}Co_{0.08}Mn_{0.04})_{0.98}Mg_{0.005}Ti_{0.015}O_2$. The positive active material as particles after the thermal treatment was sampled and passed through a stainless steel sieve to crush agglomerated particles.

(2) Manufacture of Lithium Secondary Battery

About 92 wt % of the prepared positive active material, 4 wt % of carbon black as a conducting agent, and 4 wt % of polyvinylidene fluoride (PVDF) as a binder were dispersed in N-methyl-2-pyrrolidone (NMP) to prepare a positive electrode slurry. The positive electrode slurry was coated on an aluminum (Al) foil as a positive current collector having a thickness of about 15 μm to 16 μm, dried, and roll-pressed to manufacture a positive electrode. The positive electrode had a loading level of about 10 milligrams per cubic centimeter ($mg/cm^2$), and an electrode density of about 2.9 $g/cm^3$ to 3.1 $g/cm^3$.

A lithium metal was used as a counter electrode with respect to the positive electrode. An electrolyte solution was prepared by adding 1.15 M $LiPF_6$ to a solvent mixture of ethylene carbonate (EC), ethyl methyl carbonate (EMC), and dimethyl carbonate (DMC) in a volume ratio of 2:4:4.

A battery assembly was formed with a porous polyethylene (PE) film as a separator placed between the positive electrode and the negative electrode. Then, the electrolyte solution was injected into the battery assembly, thereby manufacturing a lithium secondary battery (coin half cell, CR 2032 type).

Example 2

1,000 g of the precipitate $Ni_{0.88}Co_{0.08}Mn_{0.04}(OH)_2$ prepared in Example 1, 463 g of $LiOH.H_2O$ (98%, available from Gangfeng Lithium Co. Ltd) as a lithium precursor, and 3.1 g of $Mg(OH)_2$ and 12.8 g of $TiO_2$ as doping-element precursors were mixed together and then thermally treated to prepare a positive active material represented by $Li_{1.03}(Ni_{0.88}Co_{0.08}Mn_{0.04})_{0.98}Mg_{0.005}Ti_{0.015}O_2$.

A lithium secondary battery was manufactured in the same manner as in Example 1, except that the positive active material prepared as above was used.

Example 3

1,000 g of the precipitate $Ni_{0.88}Co_{0.08}Mn_{0.04}(OH)_2$ prepared in Example 1, 470 g of $LiOH.H_2O$ (98%, available from Gangfeng Lithium Co. Ltd) as a lithium precursor, and 3.1 g of $Mg(OH)_2$ and 12.8 g of $TiO_2$ as doping-element precursors were mixed together and then thermally treated to prepare a positive active material represented by $Li_{0.045}(Ni_{0.88}CO_{0.08}Mn_{0.04})_{0.98}Mg_{0.005}Ti_{0.015}O_2$.

A lithium secondary battery was manufactured in the same manner as in Example 1, except that the positive active material prepared as above was used.

Comparative Example 1

100 g of the precipitate $Ni_{0.88}Co_{0.08}Mn_{0.04}(OH)_2$ prepared in Example 1 and 447 g of $LiOH.H_2O$ (98%, available from Gangfeng Lithium Co. Ltd) as a lithium precursor were mixed together and then thermally treated to prepare an undoped positive active material represented by $Li_{1.015}Ni_{0.88}Co_{0.08}Mn_{0.04}O_2$.

A lithium secondary battery was manufactured in the same manner as in Example 1, except that the positive active material prepared as above was used.

Evaluation Example 1: XRD Analysis

The positive active materials prepared in Examples 1 to 3 and Comparative Example 1 were analyzed by X-ray diffraction using a Bruker D8 Advance diffractometer with CuKα radiation (1.540598 angstroms (Å)).

Figure 2:
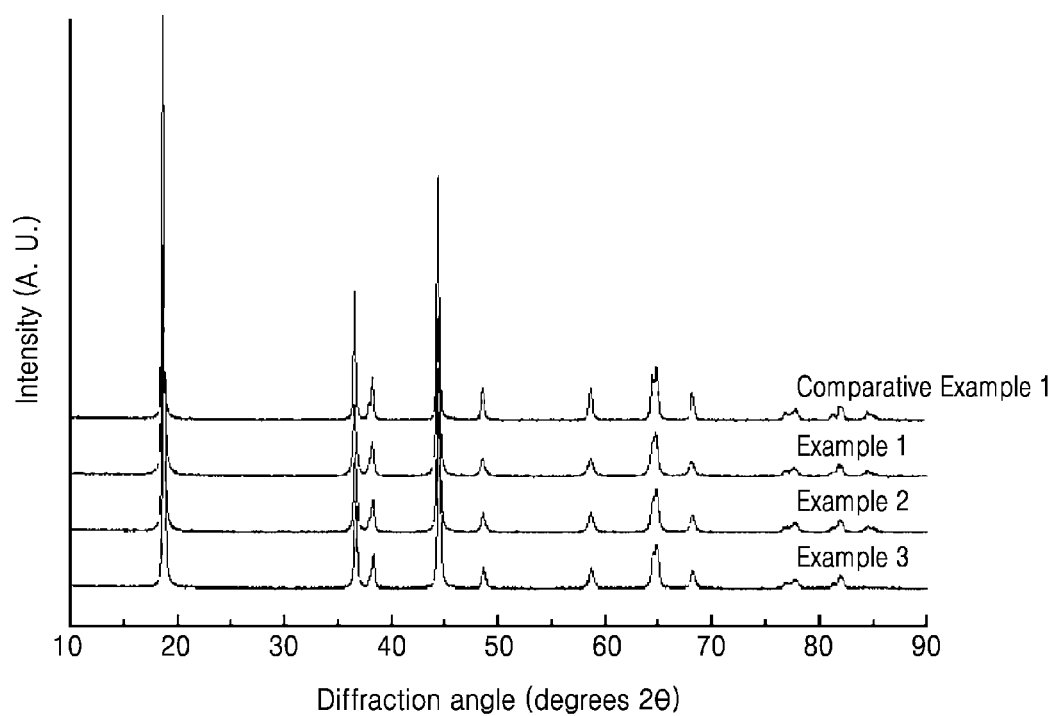
FIG. 2 is a graph of intensity (arbitrary units, a.u.) versus diffraction angle (degrees 2 theta, 2Θ) illustrating results of X-ray diffraction analysis of the positive active materials prepared in Comparative Example 1 and Examples 1 to 3.

The XRD results of the positive active materials of Examples 1 to 3 and Comparative Example 1 are shown in FIG. 2. Magnified X-ray diffraction patterns of the positive active materials of Examples 1 to 3 and Comparative Example 1 at 28 degrees corresponding to the (003) plane are shown in FIG. 3.

Referring to FIG. 2, the positive active materials of Examples 1 to 3 were found to a composition including nickel-cobalt-manganese (NCM) based on the characteristics peaks of the (003) plane and the (104) plane. The XRD results also indicate that the positive active materials of Examples 1 to 3 had a layered structure doped with Mg and Ti, free of impurities, regardless of the composition. Free of impurities such as NiO phase having the Fm3-m structure, the positive active materials of Examples 1 to 3 are expected to have high capacity and increased lifespan.

Figure 3:
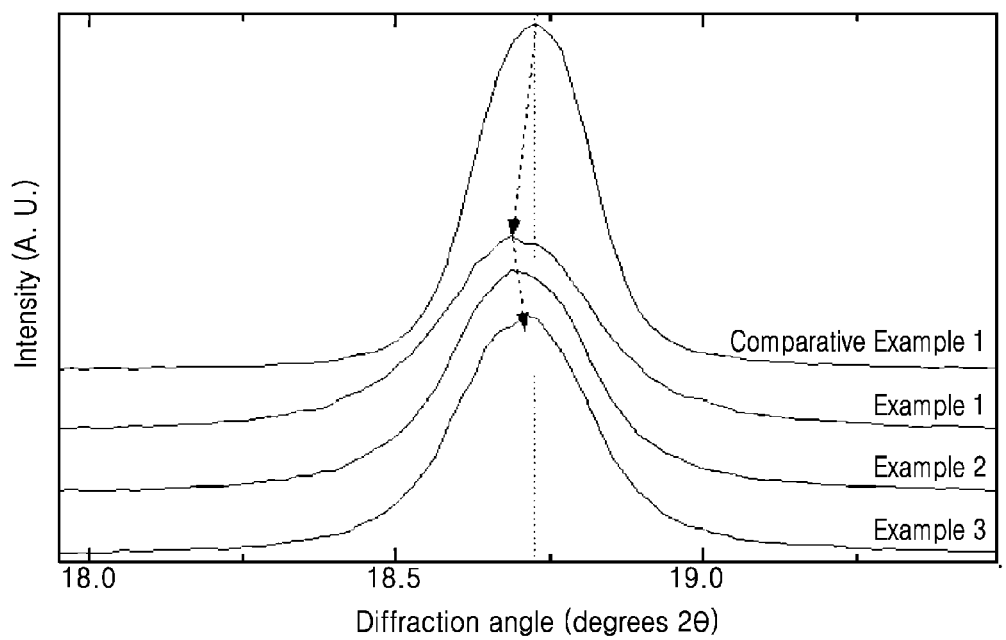
FIG. 3 is a magnified portion of the graph in FIG. 2, showing the 2θ region corresponding to a (003) plane.
Figure 5A:
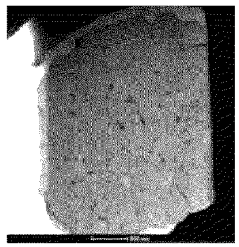
FIGS. 5A to 5D show the results of transmission electron microscope (TEM) analysis of the positive active materials of Comparative Example 1 and Examples 1 to 3.
Figure 5B:
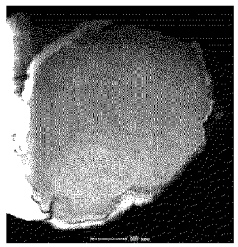
Figure 5C:
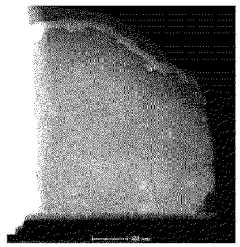
Figure 5D:
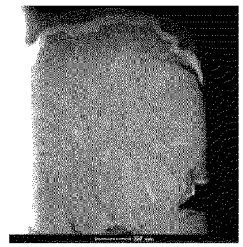
Figure 5E:
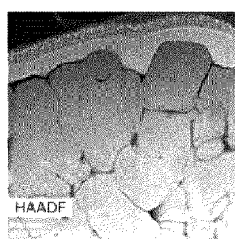
FIGS. 5E to 5H show the results of HAADF analysis of the positive active materials of Comparative Example 1 and Examples 1 to 3.
Figure 5F:
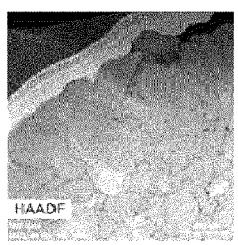
Figure 5G:
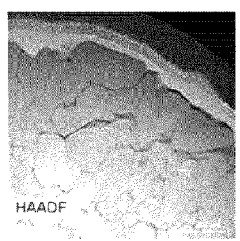
Figure 5H:
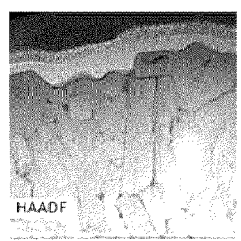
Figure 5I:
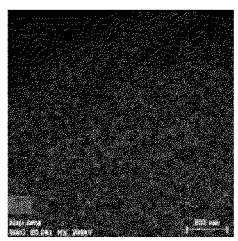
Figure 5J:
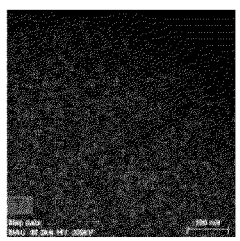
Figure 5K:
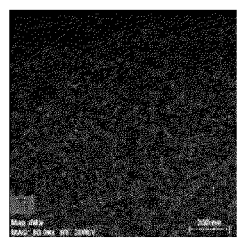
Figure 5L:
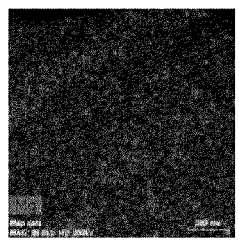
Figure 5M:
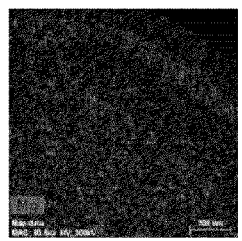
Figure 5N:
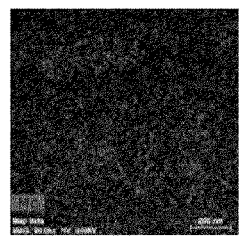

Referring to FIG. 3, the peak of the (003) plane was shifted toward lower angles in the positive active materials of Examples 1 to 3 due to the doping of Mg and Ti, indicating that the doped Mg and Ti caused lattice expansion. It was also found that the doped Mg and Ti increased a lattice constant when a Li composition was same.

In the Mg ad Ti doped compositions, the higher the Li content, the smaller the lattice constant and the smaller the full width at half maximum (FWHM), indicating that the degree of crystallinity was increased.

Evaluation Example 2: SEM Analysis

The positive active materials prepared in Examples 1 to 3 and Comparative Example 1 were analyzed by scanning electron microscopy (SEM). The SEM analysis results are shown in FIGS. 4A to 4H.

According to the SEM results, the positive active materials of Examples 1 to 3 were found to have a reduced size of grains (or primary particles) on the surface and inside the positive active materials due to the doping of Mg and Ti, but with increased uniformity of the grains (or primary particles).

In the positive active materials of Examples 1 to 3 in which the doping amounts of Mg and Ti were the same, the higher the Li content, the larger the size of grains (or primary particles), but with reduced uniformity in the size of the grains (or primary particles) in the positive active material of Example 3 including $Li_{1.045}$.

Evaluation Example 3: TEM Analysis

The positive active materials of Examples 1 to 3 and Comparative Example 1 were analyzed by transmission electron microscopy (TEM) and TEM-EDS (energy dispersive spectroscopy) mapping. The results are shown in FIG. 5.

Referring to FIG. 5, the TEM image analysis results represented the same tendency as in the SEM analysis results. That is, the positive active materials of Examples 1 to 3 were found to have a reduced size of grains (or primary particles) on the surface and inside the positive active materials due to the doping of Mg and Ti, but with increased uniformity of the grains (or primary particles).

In the positive active materials of Examples 1 to 3 in which the doping amount of Mg and Ti was same, the higher the Li content, the larger the size of grains (or primary particles), but with a reduced size uniformity of grains (or primary particles) in the positive active material of Example 3 including $Li_{1.045}$.

The TEM-EDS mapping results indicate that the positive active materials of Examples 1 to 3 had a uniform distribution of the doping elements Mg and Ti in the positive active material.

Evaluation Example 4: Charge-Discharge Characteristics Evaluation

The initial coulombic efficiency, capacity, and cycle lifetime characteristics of each of the lithium secondary batteries manufactured in Examples 1 to 3 and Comparative Example 1 were evaluated as follows. The results are shown in Table 1.

In a formation process of each of the manufactured lithium secondary batteries, a $1^{st}$ cycle of charging and discharging each lithium secondary battery was performed (in a constant current (CC) mode) with a current of 0.1 C in a voltage range of about 4.35 V-2.8 V (with respect to Li). Subsequently, the lithium secondary battery was then charged with a current of 0.33 C (CC mode) until a voltage of about 4.35 V (with respect to Li) was reached, and then with the constant voltage of about 4.35 V (constant voltage (CV) mode) until a cutoff current of 0.05 C rate was reached, followed by discharging with a current of 0.2 C until a voltage of 2.8 V (with respect to Li) was reached. To evaluate cycle lifetime characteristics, each lithium secondary battery was charged with a constant current of 1 C rate until a voltage of 4.35 V was reached, and then discharged with a constant current of 1 C until a voltage of 2.8 V was reached. This charge and discharge cycle was repeated 50 times.

Figure 6:
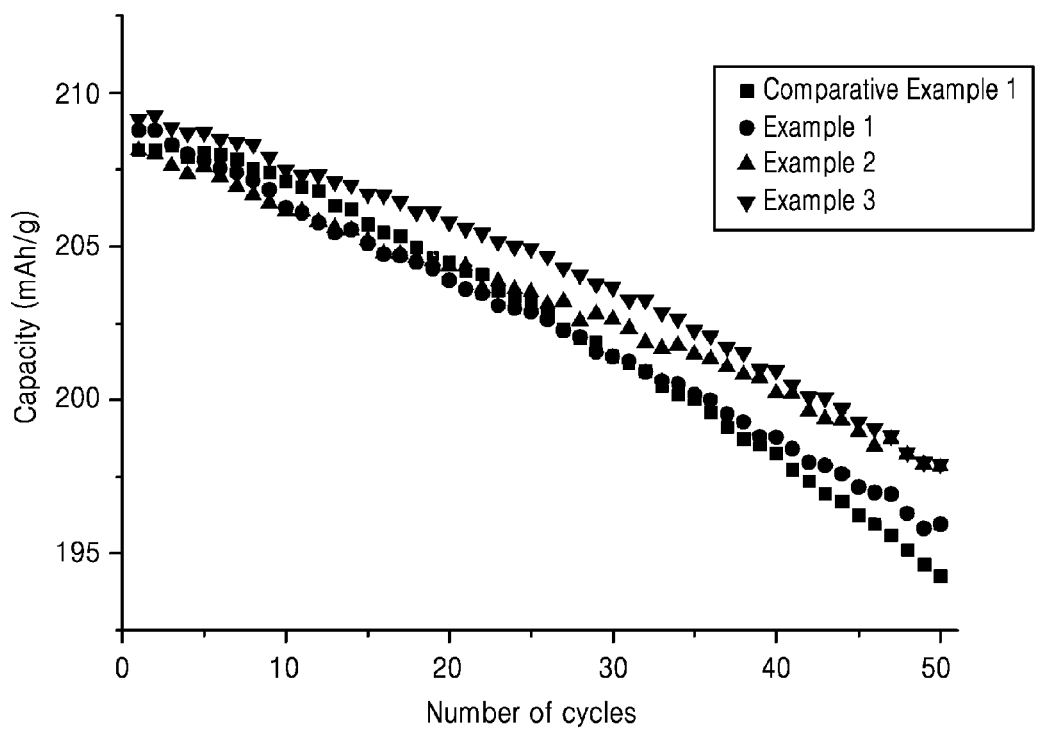
FIG. 6 is a graph of capacity (milliampere hours per gram, mAh/g) versus number of cycles for lithium secondary batteries manufactured in Comparative Example 1 and Examples 1 to 3.

The initial coulombic efficiencies, capacities, and cycle lifetime characteristics of the lithium secondary batteries of Examples 1 to 3 and Comparative Example 1 are shown in Table 1. The capacity of each lithium secondary battery with respect to the number of cycles is shown in FIG. 6. The initial coulombic efficiency (also referred to as initial efficiency (I.E.)) is defined as a ratio of the discharge capacity at the $1^{st}$ cycle to the charge capacity at the $1^{st}$ cycle. A specific capacity is defined as a discharge capacity at the $2^{nd}$ cycle. A capacity retention rate at each cycle is defined as Equation 1.

Capacity retention rate [%]=[Discharge capacity at each cycle/Discharge capacity at $1^{st}$ cycle]× 100%     Equation 1

Grain sizes and (003) XRD peak characteristics in the positive active materials of Examples 1 to 3 and Comparative Example 1 are shown in Table 1.

TABLE 1

| Example | Composition of positive active material | Initial efficiency (%) | Specific capacity (mAh/g) | Capacity retention rate after $50^{th}$ cycle (%) | Grain size range | (003) XRD peak FWHM | Peak location (degrees 2θ) |
|---|---|---|---|---|---|---|---|
| Example 1 | $Li_{1.015}(Ni_{0.88}Co_{0.08}Mn_{0.04})_{0.98}Mg_{0.005}Ti_{0.015}O_2$ | 97.8 | 224 | 93.9 | 150 nm-400 nm | 0.2362 | 18.6622 |
| Example 2 | $Li_{1.03}(Ni_{0.88}Co_{0.08}Mn_{0.04})_{0.98}Mg_{0.005}Ti_{0.015}O_2$ | 97.7 | 223 | 95.1 | 50 nm-100 nm | 0.2362 | 18.6708 |
| Example 3 | $Li_{1.045}(Ni_{0.88}Co_{0.08}Mn_{0.04})_{0.98}Mg_{0.005}Ti_{0.015}O_2$ | 97.6 | 224 | 94.6 | 100 nm-200 nm | 0.2165 | 18.7323 |
| Comparative Example 1 | $Li_{1.015}Ni_{0.88}Co_{0.08}Mn_{0.04}O_2$ | 96.1 | 220 | 93.4 | 100 nm-400 nm | 0.2165 | 18.7680 |

Referring to Table 1 and FIG. 6, the lithium secondary batteries of Examples 1 to 3 were found to have improved initial efficiencies, capacities, and cycle lifetime characteristics, due to the doping of Mg and Ti and optimized Li content.

Examples 4 to 11 and Comparative Examples 2 and 3: Charge-Discharge Characteristics Evaluation with Increasing Ti:Mg Ratio Positive active materials of Examples 4 to 7 and Comparative Example 2 were prepared using $Ni_{0.88}Co_{0.08}Mn_{0.04}(OH)_2$ having an average particle diameter (D50) of about 2.5 μm as a positive active material precursor. In particular, the positive active materials of Examples 4 to 7 were prepared with controlling the amounts of $Mg(OH)_2$ and $TiO_2$ to have a different doping ratio of Mg and Ti as shown in Table 2, while the positive active material of Comparative Example 2 was undoped with Mg or Ti. In preparing the positive active materials, the thermal treatment temperature was about 750° C.

Positive active materials of Examples 8 to 11 and Comparative Example 3 were prepared using $Ni_{0.88}Co_{0.08}Mn_{0.04}(OH)_2$ having an average particle diameter (D50) of about 2.0 μm as a positive active material precursor. In particular, the positive active materials of Examples 8 to 11 were prepared with controlling the amounts of $Mg(OH)_2$ and $TiO_2$ to have a different doping ratio of Mg and Ti as shown in Table 2, while the positive active material of Comparative Example 3 was undoped with Mg or Ti. In preparing the positive active materials, the thermal treatment temperature was about 750° C.

The processes of preparing the positive active materials of Examples 4 to 11 and Comparative Examples 2 and 3 and the processes of manufacturing the lithium secondary batteries including the same were the same as in Example 1, except for the above-described preparation conditions.

The initial efficiency, capacity, and cycle lifetime characteristics of each of the lithium secondary batteries of Examples 4 to 11 and Comparative Examples 2 and 3 were evaluated according to Evaluation Example 4. The results are shown in Table 2.

Examples 12 and 13 and Comparative Examples 4 and 5: Evaluation of Effects of Doping Positive Active Material Having Large Particle Diameter Effects of doping a positive active material precursor having a relatively large particle diameter with Mg and Ti, were compared to the positive active material precursor used in the above-described preceding examples, and were evaluated as follows.

Positive active materials of Example 12 and Comparative Example 4 having a composition as shown in Table 3 were prepared using $Ni_{0.88}Co_{0.08}Mn_{0.04}(OH)_2$ having an average particle diameter (D50) of about 16.7 μm as a positive active material precursor. Positive active materials of Example 13 and Comparative Example 5 having a composition as shown in Table 3 were prepared using $Ni_{0.88}Co_{0.08}Mn_{0.04}(OH)_2$ having an average particle diameter (D50) of about 11.5 μm as a positive active material precursor. In preparing the positive active materials, the thermal treatment temperature was about 760° C.

The positive active materials of Examples 12 and 13 and Comparative Examples 4 and 5 were subjected to an additional post-treatment process to remove a residual surface lithium compound such as LiOH and $Li_2CO_3$. This post-treatment process was performed by stirring a slurry obtained by mixing each positive active material with an aqueous cobalt chloride solution to allow cobalt hydroxide to coat a surface of the positive active material by precipitation coating, removing the solution using a filter, drying the resulting positive active material at about 150° C., and then thermally treating the dried positive active material at about 720° C. to form a Co-rich oxide coating layer on the surface of the positive active material. The coating layer may include lithium and some of the elements of the positive active material. After the post-treatment process, the composition of each positive active material was analyzed by inductively coupled plasma atomic emission spectroscopy (ICP-AES). As a result, a Li content in each positive active material was found to be about 1.01.

The processes of preparing the positive active materials of Examples 12 and 13 and Comparative Examples 4 and 5 and the processes of manufacturing the lithium secondary batteries including the same were the same as in Example 1, except for the above-described preparation conditions.

TABLE 2

| Example | Precursor's average particle diameter | Composition of positive active material | Initial efficiency (%) | Specific capacity (mAh/g) | Capacity retention rate after $50^{th}$ cycle (%) |
|---|---|---|---|---|---|
| Comparative Example 2 | 2.5 μm | $Li_{1.00}Ni_{0.88}Co_{0.08}Mn_{0.04}O_2$ | 96.5 | 231 | 93.3 |
| Example 4 | | $Li_{1.00}(Ni_{0.88}Co_{0.08}Mn_{0.04})_{0.99}Mg_{0.005}Ti_{0.005}O_2$ | 95.7 | 228 | 95.2 |
| Example 5 | | $Li_{1.00}(Ni_{0.88}Co_{0.08}Mn_{0.04})_{0.988}Mg_{0.005}Ti_{0.007}O_2$ | 95.7 | 227 | 95.3 |
| Example 6 | | $Li_{1.00}(Ni_{0.88}Co_{0.08}Mn_{0.04})_{0.985}Mg_{0.005}Ti_{0.010}O_2$ | 94.3 | 221 | 95.6 |
| Example 7 | | $Li_{1.00}(Ni_{0.88}Co_{0.08}Mn_{0.04})_{0.983}Mg_{0.005}Ti_{0.012}O_2$ | 94.6 | 221 | 95.8 |
| Comparative Example 3 | 2.0 μm | $Li_{1.00}Ni_{0.88}Co_{0.08}Mn_{0.04}O_2$ | 96.6 | 232 | 90.5 |
| Example 8 | | $Li_{1.00}(Ni_{0.88}Co_{0.08}Mn_{0.04})_{0.99}Mg_{0.005}Ti_{0.005}O_2$ | 96.1 | 230 | 92.6 |
| Example 9 | | $Li_{1.00}(Ni_{0.88}Co_{0.08}Mn_{0.04})_{0.988}Mg_{0.005}Ti_{0.007}O_2$ | 95.5 | 228 | 92.6 |
| Example 10 | | $Li_{1.00}(Ni_{0.88}Co_{0.08}Mn_{0.04})_{0.985}Mg_{0.005}Ti_{0.010}O_2$ | 95.7 | 226 | 94.7 |
| Example 11 | | $Li_{1.00}(Ni_{0.88}Co_{0.08}Mn_{0.04})_{0.983}Mg_{0.005}Ti_{0.012}O_2$ | 95.3 | 225 | 94.6 |

Referring to Table 2, it was found that when the doping ratio of Ti/Mg was increased, the initial efficiency and the capacity were slightly reduced, but cycle lifetime characteristics improved.

The initial efficiency, capacity, and cycle lifetime characteristics of each of the lithium secondary batteries of Examples 12 and 13 and Comparative Examples 4 and 5 were evaluated according to Evaluation Example 4. The results are shown in Table 3.

TABLE 3

| Example | Precursor average particle diameter | Composition of positive active material ** | Initial efficiency (%) | Specific capacity (mAh/g) | Capacity retention rate after 50$^{th}$ cycle (%) |
|---|---|---|---|---|---|
| Comparative Example 4 | 16.7 μm | $Li_{1.06}Ni_{0.88}Co_{0.08}Mn_{0.04}O_2$ | 92.7 | 221 | 79.9 |
| Example 12 | | $Li_{1.06}(Ni_{0.88}Co_{0.08}Mn_{0.04})_{0.98}Mg_{0.005}Ti_{0.015}O_2$ | 92.4 | 217 | 88.9 |
| Comparative Example 5 | 11.5 μm | $Li_{1.06}Ni_{0.88}Co_{0.08}Mn_{0.04}O_2$ | 93.4 | 222 | 83.2 |
| Example 13 | | $Li_{1.06}(Ni_{0.88}Co_{0.08}Mn_{0.04})_{0.98}Mg_{0.005}Ti_{0.015}O_2$ | 91.4 | 216 | 92.3 |

(** Composition before the post-treatment process)

Referring to Table 3, as in the above-described preceding examples, it was found that the lithium secondary batteries of Examples 12 and 13 were found to have slightly reduced initial efficiency and capacity, due to the doping of Mg and Ti in their positive active material having a large particle diameter, but with improved cycle lifetime characteristics.

Example 14 and Comparative Example 6: Comparison of Doping Effects of Mg Alone and Both Mg and Ti To compare the effects of not doping, doping with Mg alone, and doping with both Mg and Ti (Mg+Ti), positive active materials of Comparative Examples 6-1 and 6-2 and Example 14 were prepared by controlling the amounts of Mg(OH)$_2$ and TiO$_2$ so as to prepare compositions shown in Table 4. In preparing the positive active materials, the thermal treatment temperature was about 775° C. The other processes of preparing the positive active materials and the processes of manufacturing lithium secondary batteries including the same were the same as in Example 1, except for the above-described preparation conditions.

The initial efficiency, capacity, and cycle lifetime characteristics of each of the lithium secondary batteries of Example 14 and Comparative Examples 6-1 and 6-2 were evaluated according to Evaluation Example 4. The results are shown in Table 4.

Figure 7A:
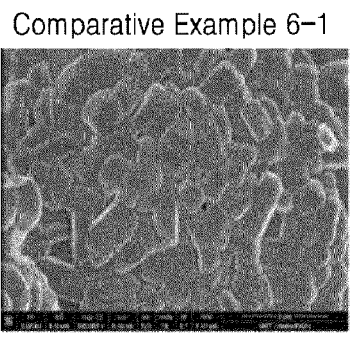
FIGS. 7A to 7C shows the results of SEM analysis of positive active materials prepared in Comparative Example 6-1, Comparative Example 6-2, and Example 14, respectively.
Figure 7B:
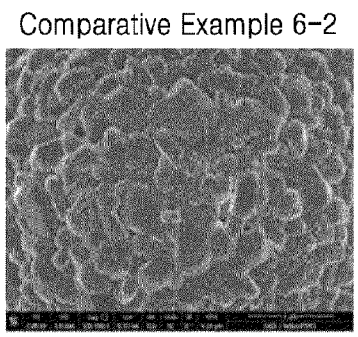
Figure 7C:
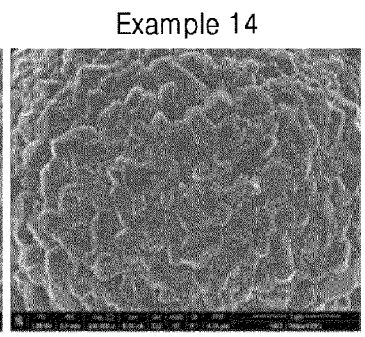
Figure 8A:
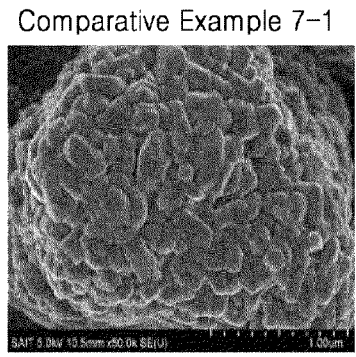
FIGS. 8A to 8F shows the results of SEM analysis of positive active materials prepared in Comparative Example 7-1 to Comparative Example 7-6, respectively.
Figure 8B:
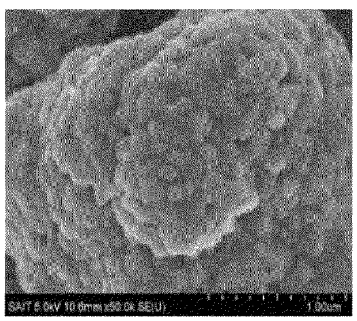
Figure 8C:
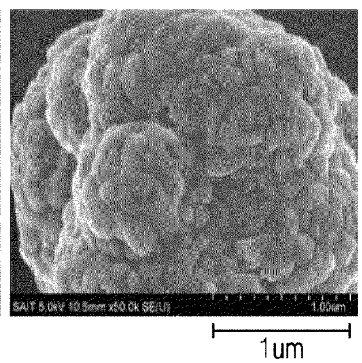
Figure 8D:
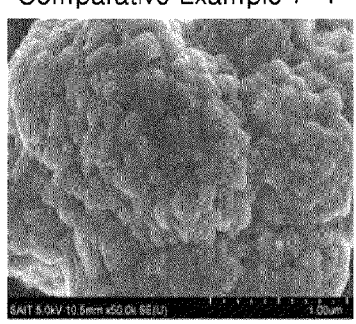
Figure 8E:
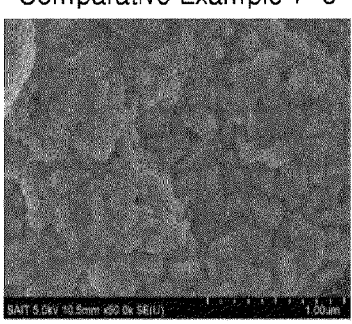
Figure 8F:
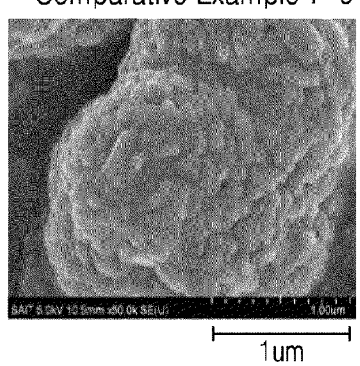

SEM images of the positive active materials of Example 14 and Comparative Examples 6-1 and 6-2 are shown in FIG. 7.

Referring to Table 4 and FIG. 7, the positive active material doped with Mg alone of Comparative Example 6-2 was found to have insignificantly improved cycle lifetime characteristics, compared to the undoped positive active material of Comparative Example 6-1. This is attributed to an increased grain size and increased grain size non-uniformity due to increased sizes of some grains.

Meanwhile, compared to the positive active material doped with Mg alone, the positive active material doped with both Mg and Ti of Example 14 was found to have improved cycle lifetime characteristics due to a reduced grain size and increased grain size uniformity.

Comparative Example 7: Comparison of Effect of Undoping and Doping with Ti Alone To compare an effect of doping a positive active material with Ti alone with an undoped positive active material, positive active materials of Comparative Examples 7-1 to 7-10 having a composition as shown in Table 5 were prepared with controlling the amount of TiO$_2$. In preparing the positive active materials, the thermal treatment temperature was about 750° C. The other processes of preparing the positive active materials and the processes of manufacturing lithium secondary batteries including the same were the same as in Example 1, except for the above-described preparation conditions.

The initial efficiency, capacity, and cycle lifetime characteristics of each of the lithium secondary batteries of Comparative Examples 7-1 to 7-10 were evaluated according to Evaluation Example 4. The results are shown in Table 5.

TABLE 4

| Example | Composition of positive active material | Initial efficiency (%) | Specific capacity (mAh/g) | Capacity retention rate after 50$^{th}$ cycle (%) |
|---|---|---|---|---|
| Comparative Example 6-1 | $Li_{1.03}Ni_{0.85}Co_{0.10}Mn_{0.05}O_2$ | 95.4 | 221 | 92.1 |
| Comparative Example 6-2 | $Li_{1.03}(Ni_{0.85}Co_{0.10}Mn_{0.05})_{0.995}Mg_{0.005}O_2$ | 95.2 | 221 | 92.4 |
| Example 14 | $Li_{1.02}(Ni_{0.85}Co_{0.10}Mn_{0.05})_{0.98}Mg_{0.005}Ti_{0.015}O_2$ | 91.3 | 216 | 96.4 |

TABLE 5

| Example | Composition of positive active material | Initial efficiency (%) | Specific capacity (mAh/g) | Capacity retention rate after 50$^{th}$ cycle (%) |
|---|---|---|---|---|
| Comparative Example 7-1 | $Li_{1.00}Ni_{0.85}Co_{0.10}Mn_{0.05}O_2$ | 97.8 | 227 | 91.3 |
| Comparative Example 7-2 | $Li_{1.00}(Ni_{0.85}Co_{0.10}Mn_{0.05})_{0.997}Ti_{0.003}O_2$ | 97.0 | 223 | 91.8 |
| Comparative Example 7-3 | $Li_{1.00}(Ni_{0.85}Co_{0.10}Mn_{0.05})_{0.995}Ti_{0.005}O_2$ | 97.6 | 226 | 90.3 |
| Comparative Example 7-4 | $Li_{1.005}(Ni_{0.85}Co_{0.10}Mn_{0.05})_{0.995}Ti_{0.005}O_2$ | 96.9 | 227 | 91.2 |
| Comparative Example 7-5 | $Li_{1.00}(Ni_{0.85}Co_{0.10}Mn_{0.05})_{0.99}Ti_{0.01}O_2$ | 97.3 | 224 | 90.9 |
| Comparative Example 7-6 | $Li_{1.01}(Ni_{0.85}Co_{0.10}Mn_{0.05})_{0.99}Ti_{0.01}O_2$ | 97.5 | 226 | 89.1 |
| Comparative Example 7-7 | $Li_{1.015}(Ni_{0.85}Co_{0.10}Mn_{0.05})_{0.985}Ti_{0.015}O_2$ | 97.5 | 225 | 86.4 |
| Comparative Example 7-8 | $Li_{1.00}(Ni_{0.85}Co_{0.10}Mn_{0.05})_{0.98}Ti_{0.02}O_2$ | 91.4 | 213 | 89.5 |
| Comparative Example 7-9 | $Li_{1.02}(Ni_{0.85}Co_{0.10}Mn_{0.05})_{0.98}Ti_{0.02}O_2$ | 97.2 | 222 | 81.8 |
| Comparative Example 7-10 | $Li_{1.03}(Ni_{0.85}Co_{0.10}Mn_{0.05})_{0.97}Ti_{0.03}O_2$ | 96.4 | 219 | 85.7 |

SEM images of the positive active materials of Comparative Examples 7-1 to 7-6 are shown in FIG. 8.

Referring to Table 5 and FIG. 8, the positive active materials doped with Ti alone of Comparative Examples 7-2 to 7-10 were found to have a reduced grain size but an insignificant improvement in cycle lifetime characteristics, compared to the undoped positive active material of Comparative Example 7-1, and in particular, with a remarkable reduction in standard capacity when the amount of Ti was greater than 1.5% (Ti>1.5%).

As described above, according to the one or more embodiments, a positive active material including a lithium transition metal composite oxide represented by Formula 1 doped with both Mg and Ti elements may suppress over-growing of grains, and may improve lifetime characteristics of a lithium secondary battery.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A positive active material for a lithium secondary battery, the positive active material comprising:
a lithium transition metal composite oxide represented by Formula 1

$$Li_aNi_bM1_cM2_dM3_eO_2 \qquad \text{Formula 1}$$

wherein, in Formula 1,
M1 includes Co, Mn, or a combination thereof,
M2 includes Mg and Ti,
M3 includes Al, B, Ca, Na, K, Cr, V, Fe, Cu, Zr, Zn, Sr, Sb, Y, Nb, Ga, Si, Sn, Mo, W, Ba, a rare earth element, or a combination thereof, 0.9≤a≤1.1, 0.7≤b<1.0, 0<c≤0.3, 0<d≤0.03, 0≤e≤0.05, and 0.95≤(b+c+d+e)≤1.05, and a molar ratio of Ti:Mg in M2 is about 1:1 to about 3:1, and
wherein the lithium transition metal composite oxide has a grain size of about 50 nanometers to about 500 nanometers.

2. A positive active material for a lithium secondary battery, the positive active material comprising: a lithium transition metal composite oxide represented by Formula 2

$$Li_aNi_bCO_cMn_{c'}Mg_{d'}Ti_{d''}M3_eO_2 \qquad \text{Formula 2}$$

wherein, in Formula 2,
M3 may include Al, B, Ca, Na, K, Cr, V, Fe, Cu, Zr, Zn, Sr, Sb, Y, Nb, Ga, Si, Sn, Mo, W, Ba, a rare earth element, or a combination thereof, 0.9≤a≤1.1, 0.7≤b<1.0, 0<c'<0.3, 0<c''<0.3, 0<(c'+c'')≤0.3, 0<d'<0.03, 0<d''<0.03, 0<(d'+d'')≤0.03, 0≤e≤0.05, and (b+c'+c''+d'+d''+e)=1, and a molar ratio of Ti:Mg is about 1:1 to about 3:1, and
wherein the lithium transition metal composite oxide has a grain size of about 50 nanometers to about 1000 nanometers.

3. The positive active material of claim 2, wherein a degree of crystallinity of the lithium transition metal composite oxide increases as an amount of Li in the lithium transition metal oxide increases.

4. A lithium secondary battery comprising the positive electrode of claim 3.

5. A positive electrode comprising the positive active material of claim 2.

6. The positive active material of claim 1, wherein the lithium transition metal composite oxide comprises a layered crystalline phase belonging to an R-3m space group.

7. The positive active material of claim 1, wherein the lithium transition metal composite oxide does not comprise a crystalline phase belonging to an Fm3̄m space group.

8. The positive active material of claim 1, wherein a degree of crystallinity of the lithium transition metal composite oxide increases as an amount of Li in the lithium transition metal oxide increases.

9. The positive active material of claim 1, wherein the lithium transition metal composite oxide is in the form of small-diameter particles having an average particle diameter of about 1 micrometer to about 5 micrometer, the small-diameter particles comprising an agglomeration of a plurality of grains of the lithium transition metal composite oxide.

10. The positive active material of claim 1, wherein the lithium transition metal composite oxide is in the form of large-diameter particles having an average particle diameter of about 10 micrometers to about 20 micrometers, the large-diameter particles comprising an agglomeration of a plurality of grains of the lithium transition metal composite oxide.

11. The positive active material of claim 1, wherein the positive active material comprises small-diameter particles having an average particle diameter of about 1 micrometer to about 5 micrometer and large-diameter particles having an average particle diameter of about 10 micrometers to about 20 micrometers, wherein the small-diameter particles and the large-diameter particles comprise an agglomeration of a plurality of grains of the lithium transition metal composite oxide.

12. The positive active material of claim 1, wherein Mg and Ti are uniformly distributed in the lithium transition metal composite oxide.

13. The positive active material of claim 1, further comprising a surface modifying layer on a surface of the positive active material.

14. The positive active material of claim 13, wherein the surface modifying layer comprises a surface coating layer comprising a metal compound comprising a metal oxide, a metal sulfide, a metal chloride, a metal nitride, a metal fluoride, a metal phosphide, a metal alkoxide, or a combination thereof.

15. A positive electrode comprising the positive active material of claim 1.

16. A lithium secondary battery comprising the positive electrode of claim 15.

17. A method of preparing the positive active material of claim 1, the method comprising:
   providing a mixture comprising a transition metal precursor, a lithium source, a Mg-containing compound, and a Ti-containing compound; and
   thermally treating the mixture to prepare the lithium transition metal composite oxide represented by Formula 1,
   wherein an amount of the Mg-containing compound and an amount of the Ti-containing compound are such that a molar ratio of Ti:Mg is about 1:1 to about 3:1, and
   wherein the lithium transition metal composite oxide has a grain size of about 50 nanometers to about 500 nanometers.

18. The method of claim 17, wherein the providing of the mixture comprises preparing the mixture by dry mixing the lithium source, the Mg-containing compound, and the Ti-containing compound.

19. The method of claim 17, wherein the thermal treatment of the mixture is performed at about 600° C. to about 1,000° C. in an atmosphere comprising oxygen.

20. The method of claim 17, further comprising removing free lithium from a surface of the positive active material using a solvent.

21. The method of claim 17, further comprising forming a surface coating layer on a surface of the positive active material.

* * * * *